F. N. MOORE.
DIRECTION INDICATING SIGNAL FOR AUTOMOBILES.
APPLICATION FILED APR. 14, 1917.
1,269,838.
Patented June 18, 1918.
3 SHEETS—SHEET 1.
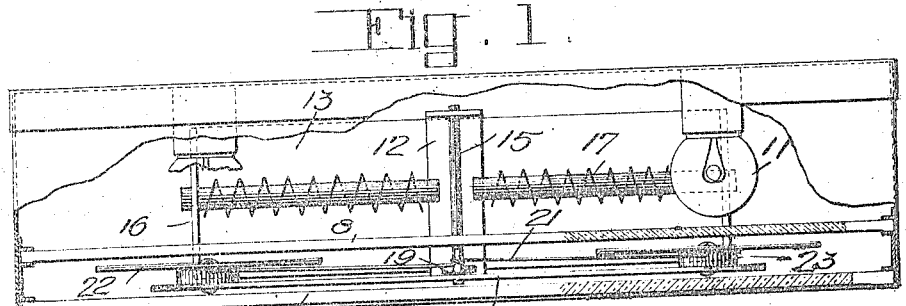
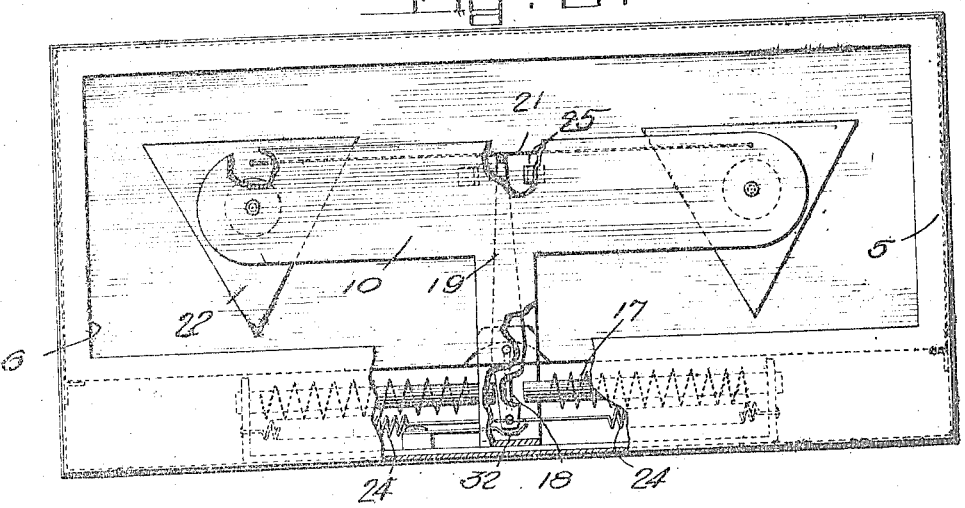
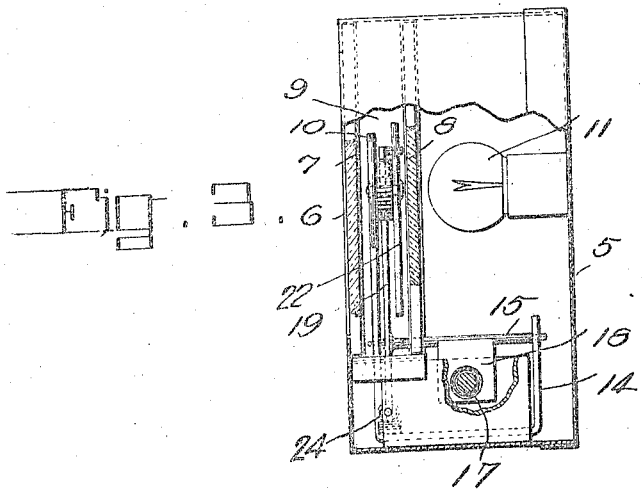
WITNESSES
INVENTOR
Floyd N. Moore
BY
ATTORNEYS

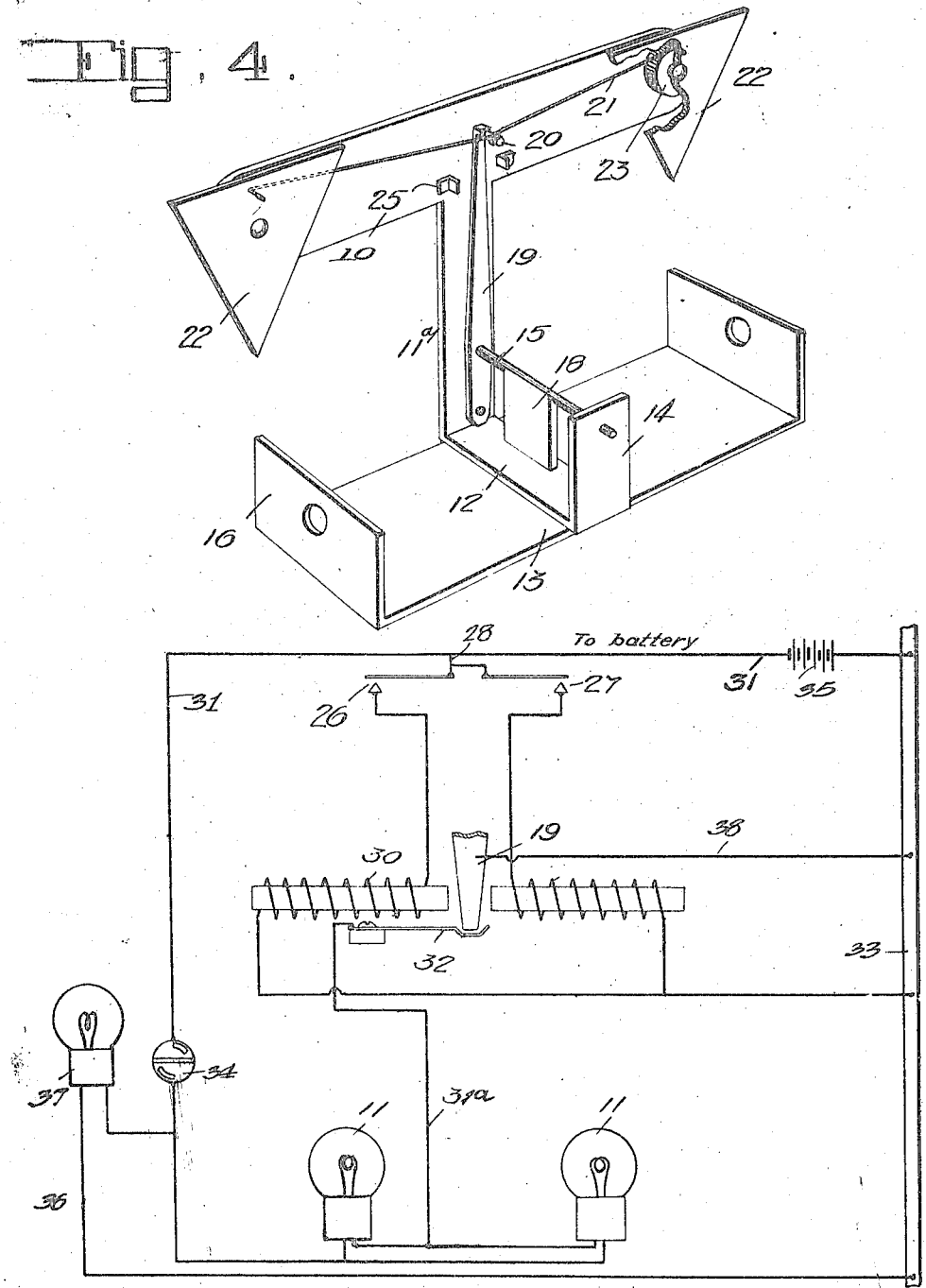

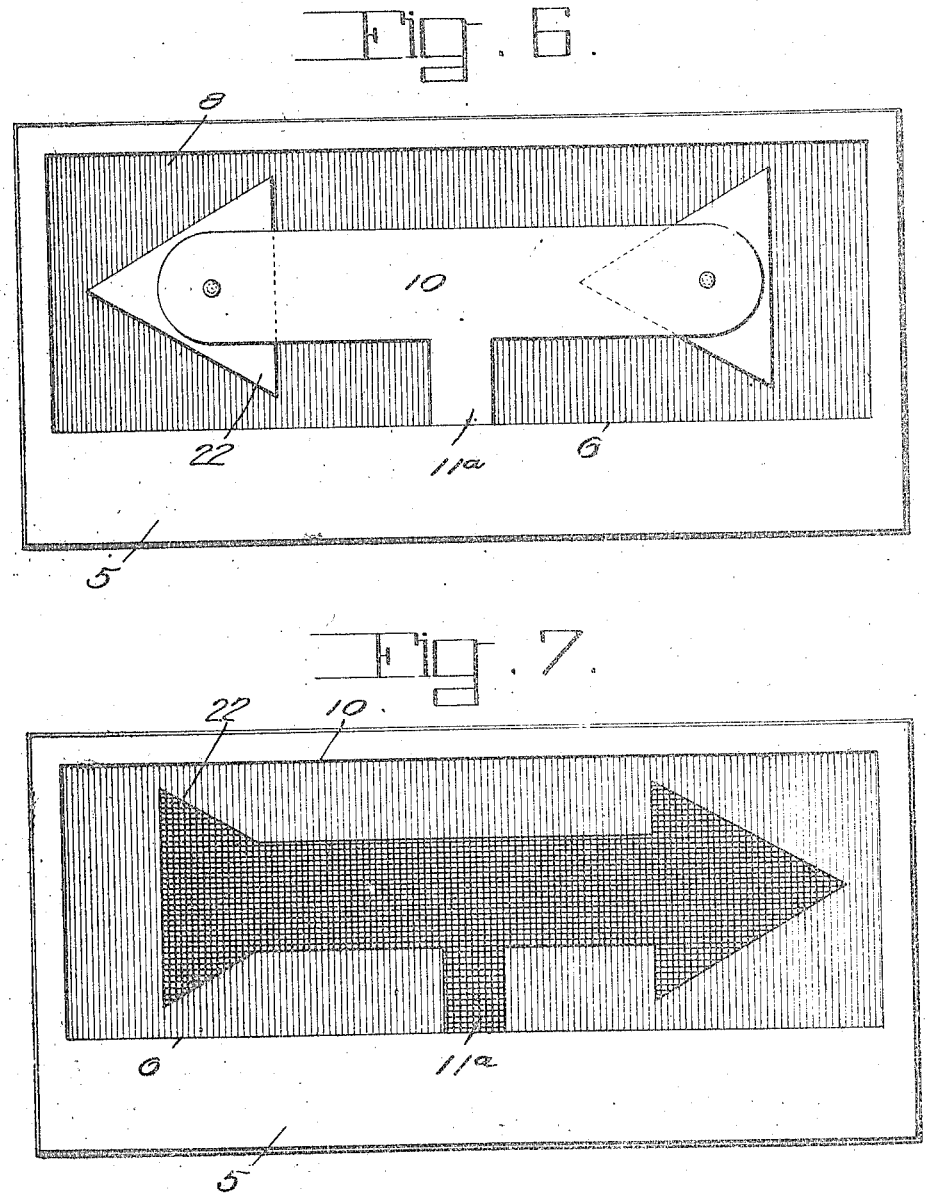

UNITED STATES PATENT OFFICE.

FLOYD N. MOORE, OF PEORIA, ILLINOIS.

DIRECTION-INDICATING SIGNAL FOR AUTOMOBILES.

1,269,838.	Specification of Letters Patent.	Patented June 18, 1918.

Application filed April 14, 1917. Serial No. 162,013.

*To all whom it may concern:*

Be it known that I, FLOYD N. MOORE, a citizen of the United States, and a resident of Peoria, in the county of Peoria and State of Illinois, have invented certain new and useful Improvements in Direction-Indicating Signals for Automobiles, of which the following is a specification.

One of the principal objects of my invention is to provide an improved signal for use upon an automobile or allied vehicle, whereby to indicate to approaching or following pedestrians and vehicle drivers any intended maneuvers on the parts of the vehicle carrying the signal, the signal forming the subject of my invention being designed particularly with reference to efficiency in operation, simplicity in design and construction, and economy in manufacture and maintenance.

Another object of the invention contemplates the provision of a signal of the type in which an arrow is used for indicating the direction of a turn to be made, the construction being such that the head and tail of the arrow, which are formed of equilateral triangular plates, may be moved at will in unison to attain positions for reversing the directions in which the arrow points.

With these and other objects in view which will become apparent as the description proceeds, the invention resides in the construction, combination and arrangement of parts hereafter more fully described and claimed, and illustrated in the accompanying drawings in which like characters of reference indicate like parts throughout the several figures, of which—

Figure 1 represents a view partially in section taken horizontally of the signal constructed in accordance with my invention, the main portion of the view being a top plan of the signal.

Fig. 2 represents an elevational view of the signal, parts being broken away to disclose the construction and arrangement of parts.

Fig. 3 represents a view in end elevation, partially in section, showing the internal structure of the signal.

Fig. 4 represents a view in perspective of the plate forming the arrow and associated parts, the view showing the method of operating the triangular head and tail plates of the arrow.

Fig. 5 represents a diagrammatical plan view of the wiring system of the signal.

Fig. 6 represents an elevational view of the signal as it would appear in the day time, and Fig. 7 represents an elevational view of the signal as it would appear at night.

Referring more particularly to the drawings, the casing in which the signal is mounted is indicated generally at 5, and this casing at what may be termed the front face of the signal is provided with an opening at 6 over which a pane of clear glass 7 is mounted. Mounted within the casing in parallel and spaced relation with the pane of glass 7, is a red ground glass plate 8 between which plate and plate 7 a compartment 9 is defined in which the arrow plate 10 is arranged. The ground side of the red glass 8 is directed toward the rear wall of the casing, and on this rear wall are mounted the lamps 11, which when lighted project their rays through the red glass and show the arrow in silhouette relief, at night, as indicated in Fig. 7.

The arrow plate 10 is arranged in a horizontal position, and is formed integrally with an upright 11ª which at its lower portion is bent at right angles as at 12, and secured transversely to the central portion of a base plate 13, the extremity 14 of the plate 11ª being bent upwardly into parallel relation with the main portion of the upright, forming therewith a journal on which a shaft 15 is rotatably mounted. The base plate 13 is secured to the bottom of the casing in a suitable manner, and the ends of the plate are bent upwardly at right angles as at 16, and are adapted to support the cores of the electro-magnets 17, which serve to operate the signal. Secured to the shaft 15 and depending therefrom, is a metallic plate 18 serving as an armature upon which the magnets act, and this plate depends between the electro-magnets as clearly shown in the drawing. A lever 19 is secured intermediate its ends on the shaft 15, and is arranged immediately at the rear of the upright 11ª. The upper end of the lever is bent rearwardly at right angles and is rounded as at 20 and around this portion 20 is turned the central portion of wire 21, which wire forms a reach rod through the operation of which the equilateral triangular plates 22, which form the head and tail of the arrow, are simultaneously operated.

The plates 22 are centrally pivoted upon blocks 23, which are mounted adjacent the ends of the arrow plate 10. The lower end of the lever 19 is connected with the coil springs 24 at the inner ends of the latter. The outer ends of the coil springs are connected each with one of the upright end portions 16 of the base plate 13, and these springs operate to normally hold the lever in the neutral position indicated at Fig. 4. After the armature 18 has been released by either of the electro-magnets 17, such armature having been attracted by the magnet for operating the triangular plates 22, the springs will move the lever into its neutral position and hold it until it is again actuated under the influence of one of the magnets. The outer ends of the reach rod 21 are connected with the plates 22 above their centers so that as the lever is moved in one direction or another, the triangular plates will be operated in synchronism to assume positions representing an arrow pointing in one direction or the other. The stops 25 secured on the inner face of the arrow plate, serve to limit the movement of the lever in both directions.

As shown in Fig. 5, a lead wire 31 is grounded at one end on the frame of the vehicle indicated at 33 and is connected at the other end to one of the terminals of a lightning switch 34, and a battery 35 of suitable construction is interposed in the length of the lead wire. A branch wire 36 leads from this lead wire 31 on the opposite side of the switch from the battery through a light 37 which may be the head, side or tail light of the automobile, and is then grounded on the frame. The wire 31 passes through the lights 11, as shown, for energizing these lights when the switch 34 is closed to close the circuit. A branch wire 31ª leads from the wire 31 between the lamps 11 and is connected to the spring terminal member 32 with which the lever 19 coöperates. Another wire 38 leads from the lever and is grounded on the frame, as shown. A branch wire 28 leads from the lead wire 31 between the switch 34 and the battery 35 and is, in turn, branched to connect with the coils 30 of electro-magnets, switches 26 and 27 being interposed in the branches, the said switches being of any usual or desired type and mounted at any suitable point on the automobile, as, for instance, on the steering wheel. From the coils 30 the branches are grounded on the frame, as shown.

If a turn is to be made in either direction the proper push button 26 or 27 is depressed, whereby to energize one of the electro-magnets, the magnet attracting the armature 18 to swing the lever 19 upon its pivot, and as the lever swings the lower end thereof will contact with the contact member 32, closing the circuit to the lamps 11, provided that the lighting switch is closed. The movement of the lever 19 will effect a shifting movement of the triangular plates 22 into a position to effect, with the plate 10, the representation of an arrow pointing in the direction in which the turn is to be made.

When, for instance, the switch 26 is closed, the current passes from the battery through the wires 31 and 28, the switch 26 and the winding 30 to ground. The arm 19 is swung, and the lower end thereof contacts with the contact member 32. The current now passes from the battery by way of the wire 31 to the switch 34, if the lighting switch is closed, through the light 37 and by way of the wire 36 to ground. The current also passes through the lights 11. When the switch 34 is open the lights are not lighted.

In the day time the signal will be viewed through the clear glass plate 7 and will appear as indicated in Fig. 6. At night the signal will be silhouetted against the red glass plate 8, as indicated in Fig. 7. Of course, in the day time the tail light, or the headlights as the case may be, will be turned off, so that the lamps will not flash when the signal is actuated. At night, however, upon each actuation of the signal, the lamps in back of the red glass will be illuminated whereby to bring the signal into relief for vividly attracting the attention of following or approaching pedestrians and drivers, as the case may be.

Although I have described the preferred embodiment of my invention, I may desire to make such changes in the construction, combination and arrangement of parts thereof, as do not depart from the spirit of the invention and the scope of the appended claims.

I claim:

1. In a signal, a casing having an opening in one side, a clear glass pane covering the opening, a colored ground glass pane arranged in the casing in spaced relation to the clear glass and defining between them a signal compartment, electric lamps arranged behind the colored glass, a plate in the shape of an arrow body arranged in the signal compartment in position to be visible through the clear glass in the day time, and to be visible in relief against the ground glass at night when the lamps are lighted, triangular plates rotatably mounted at the ends of the arrow plate, means for shifting the triangular plates in synchronism, at will, relatively to the arrow plate for producing the representation of an arrow pointing in one direction or the other, and means operating in unison with the triangular plates for controlling the circuit in which the lamps are included, whereby when the circuit is energized the lamps will be lighted upon movement of the triangular plates into arrow representing position.

2. In a signal, a casing having an opening therein, a base plate arranged in the casing having upturned ends, an arrow plate in the shape of an arrow body arranged in the casing and visible through the opening and having an upright portion secured to the base plate whereby to support the arrow plate, triangular plates rotatably mounted on the arrow plate adjacent the ends of the latter, a shaft rotatably mounted relatively to the arrow plate, an armature fixed on the shaft, a lever fixed for movement with the shaft and projecting at one end between the triangular plates, a reach rod connecting the lever with the triangular plates for effecting a movement of the triangular plates in unison when the lever is moved, springs arranged on opposite sides of the lever and connected at their outer ends to the upturned portions of the base plate, and at their inner ends to the lever whereby to hold the latter normally in neutral position, electro-magnets mounted on the upturned end portions of the base plate on opposite sides of the armature, and means for energizing the magnets at will.

3. A signal including a base plate, an arrow plate mounted on the base plate, said arrow plate being in the form of the body of an arrow, triangular plates rotatably mounted adjacent the ends of the arrow plate, a lever pivotally mounted relatively to the arrow plate and projecting at one end between the triangular plates, a rod connecting the lever with the triangular plates for effecting a unity of movement between them when the lever is moved, means for normally retaining the lever in neutral position, an armature connected with the lever for moving the latter when the armature is shifted in one direction or another, and electro-magnets mounted on the base plate on opposite sides of the armature for effecting movement of the latter when either of the electro-magnets is energized.

4. A signal including an arrow plate having triangular plates rotatably mounted against its ends, a ground glass plate arranged behind the arrow plate, lamps arranged behind the ground glass plate for throwing the arrow plate into relief against the ground glass plate at night when the lamps are illuminated, means for operating the triangular plates at will for moving them into position representing an arrow pointing in one direction or another, said means including a lever, and means coöperating with the lever in controlling the circuit in which the lamps are included, whereby when the circuit is energized the lamps will be lighted upon movement of the lever for shifting the triangular plates into arrow representing position.

5. A signal including a plate representing the body of an arrow, triangular plates arranged adjacent the ends of the body plate and being mounted for movement into positions for coöperating with the body plate in representing an arrow pointing in one direction or another, operating means for causing movements of the triangular plates in unison to attain positions for representing an arrow, and electrical apparatus for actuating said operating means.

6. In a signal, an arrow plate in the form of the body of an arrow, triangular plates pivotally mounted adjacent the ends of the arrow plate, and means operable at will for moving the triangular plates into position for coöperating with the arrow plate in reproducing an arrow pointing in one direction or another.

7. In a signal, an arrow plate in the form of the body of an arrow, means at the ends of said plate and pivoted thereto for giving to the said plate the representation of an arrow and mounted to turn in either direction, and means operable at will for moving the said means into position for coöperating with the arrow plate in reproducing an arrow pointing in either direction.

FLOYD N. MOORE.

Witnesses:
CHARLES W. HARPER,
NEWTON R. MOORE.